United States Patent [19]

Shimura et al.

[11] Patent Number: 4,772,111

[45] Date of Patent: Sep. 20, 1988

[54] OPTICAL MIRROR WITH C/C COMPOSITE SUBSTRATE AND AN INTERMEDIATE LAYER OF MOLYDENUM, TUNGSTEN, OR NIOBIUM 40 TO 100 μM THICK

[75] Inventors: Hirofumi Shimura; Yuji Enomoto; Yusei Noguchi; Yoshitaka Tatsue; Hidenori Shinno, all of Ibaraki, Japan

[73] Assignees: Agency of Industrial Science & Technology; Ministry of International Trade & Industry, both of Tokyo, Japan

[21] Appl. No.: 31,597

[22] Filed: Mar. 30, 1987

[30] Foreign Application Priority Data

Mar. 31, 1986 [JP] Japan .................................. 61-73152

[51] Int. Cl.$^4$ .......................... G02B 1/00; G02B 5/08; B32B 5/10
[52] U.S. Cl. ..................................... 350/641; 350/609; 428/912.2; 428/664; 428/662; 428/687; 428/634
[58] Field of Search ............... 350/607, 609, 641, 642, 350/600; 428/912.2, 408, 457, 687, 664, 663, 662, 634, 670, 657, 674, 672

[56] References Cited

U.S. PATENT DOCUMENTS

| 4,433,045 | 2/1984 | Gowan et al. | 350/607 |
| 4,451,119 | 5/1984 | Meyers et al. | 350/607 |
| 4,643,518 | 2/1987 | Taniguchi | 350/6.8 |
| 4,655,563 | 4/1987 | Plante et al. | 350/607 |
| 4,657,358 | 4/1987 | Anthony et al. | 350/607 |

Primary Examiner—Jon W. Henry
Attorney, Agent, or Firm—Oblon, Fisher, Spivak, McClelland & Maier

[57] ABSTRACT

An optical mirror in which a mirror surface formation material, e.g. aluminum, is coated on a substrate consisting of a c/c composite and having a predetermined shape. The coated mirror surface formation material layer is ultrahigh precision machined to a small thickness such that its deformation is suppressed by the substrate.

8 Claims, 1 Drawing Sheet

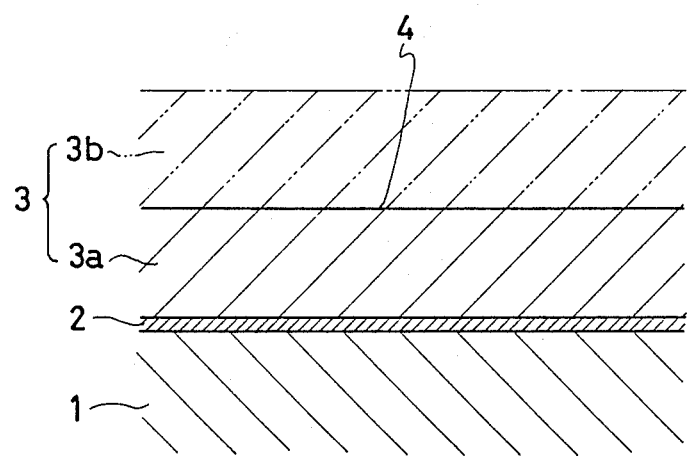

OPTICAL MIRROR WITH C/C COMPOSITE SUBSTRATE AND AN INTERMEDIATE LAYER OF MOLYDENUM, TUNGSTEN, OR NIOBIUM 40 TO 100 μM THICK

BACKGROUND OF THE INVENTION

1. Field of the Invention

This invention relates to an optical mirror which can be suitably used for lightweight large mirrors, high-speed revolving polygonal mirrors, high output laser reflecting mirrors, copier drums, movable mirrors for cameras and X-ray mirrors.

2. Description of the Prior Art

At present, large-size mirrors, high-speed revolving polygonal mirrors and high output laser reflecting mirrors are constituted by ultrahigh precision finishing of aluminum alloy or oxygen-free copper through turning, milling, etc., to a predetermined shape and then forming a mirror surface by coating with gold or the like.

Desirably, these mirrors should not be deformed by heat of the light they reflect or by centrifugal or other externally applied forces. However, the material used for forming the mirror surface of the mirror has a lower specific gravity and coefficient of thermal expansion and a higher modulus of elasticity than those of the metallic material used as substrate. Therefore, deformation of the mirror under gravitational and centrifugal forces, and heat etc. is inevitable. Further, deformation of the material from which the mirror surface is formed caused at the time of the machining sometimes appears as a strain with temperature increase at the time of use or over long use.

OBJECT OF THE INVENTION

An object of the present invention is to provide an optical mirror which is substantially free of deformation due to the gravity, external forces or heat.

SUMMARY OF THE INVENTION

To attain the above object of the present invention, there is provided an optical mirror in which a mirror surface formation material, e.g. aluminum, is coated on a substrate consisting of a c/c composite and having a predetermined shape, and the coated mirror surface formation material layer is ultrahigh precision machined to a small thickness such that its deformation is suppressed by the substrate.

The c/c composite used as the substrate has a low specific weight and a high modulus of elasticity, so that the deformation of the mirror as a whole due to gravitational force and centrifugal and other external forces is small. Further, since the coefficient of thermal expansion of the substrate is small, the thermal deformation is reduced. Also, since the thermal conductivity is high, even if the mirror surface formation material should be locally heated, the generated heat is quickly transmitted to the substrate to substantially uniformalize the temperature, thus preventing adverse effects on the mirror surface formation material with local temperature rise.

Further, the mirror surface formation material is coated to such a small thickness that its deformation due to heat or other causes is suppressed by the substrate. Thus, even if there occurs a temperature change such that the mirror surface formation material tends to be deformed, the deformation is suppressed by the substrate having high mechanical strength.

The above and other objects and features of the invention will become more apparent from the following detailed description with reference to the accompanying drawing.

BRIEF DESCRIPTION OF THE DRAWING

The drawing is a sectional view showing an embodiment of the optical mirror according to the invention.

DETAILED DESCRIPTION OF THE PREFERRED EMBODIMENT

The drawing is a sectional view showing an embodiment of the optical mirror according to the present invention. Reference numeral 1 designates a substrate for the mirror. On the substrate 1, an intermediate member 2 is provided for joining the substrate 1 and mirror surface formation material 3 with high mechanical strength. The mirror surface formation material 3 on the intermediate member 2 is of a well-known type, e.g. an aluminum alloy, a copper alloy, tungsten, molybdenum, iridium, rhodium, gold or platinum.

The substrate 1 noted above consists of a c/c composite, which is composed of carbon as matrix material and incorporates carbon fibers as a reinforcing material. More specifically, a c/c composite material of a flat woven lamination or three-dimensional structure material is cut to a predetermined shape. When molding the substrate from the c/c composite material, part of the carbon fibers constituting the material are orientated such that they extend in a perpendicular direction to the mirror formation surface. As a result, elongation of fibers can be prevented to eliminate deformation of the mirror surface.

The intermediate layer 2 is formed on the substrate 1 by plasma spraying or laser spraying to form a coat of a metal having excellent bonding property with respect to both the substrate and the mirror surface formation material, e.g. molybdenum, tungsten or niobium. This intermediate layer 2 may have a thickness of 40 to 100 μm. It may be dispensed with when the mirror surface formation material is a material having excellent bonding property with respect to the c/c composite, e.g. molybdenum, tungsten or the like.

Subsequently, the mirror surface formation material 3 is coated on the intermediate layer 2 or substrate 1 to a thickness of several hundreds to about one thousand of μm. Then an upper portion 3b of the coating layer 3 is ground and polished away through ultrahigh precision turning, milling, lapping, etc. to a predetermined thickness, thus forming a mirror surface 4. The thickness of the coated mirror surface formation material layer 3 is desirably such that the thickness of the remaining coating layer 3a with the mirror surface 4 formed by grinding and polishing away the mirror surface is as thin as possible within the range in which the mirror surface can be polished without any problem, so that deformation of the coating layer 3a due to heat or other causes is suppressed by the substrate. More specifically the thinner the remaining layer 3a of the mirror surface formation material is, the less the deforming that tends to act thereon because of heat or other causes. As a result, deformation is prevented because the layer is thin so that the generated deforming forces are small and also the layer is directly or indirectly strongly bonded to the substrate. In addition, the generated heat is transmitted to the substrate, so that no local heating occurs. Thus, the thickness of the coated mirror surface formation material 3 is the sum of the upper portion 3b of layer that is removed by grinding and polishing for the formation of the mirror surface and the remaining lower portion 3a having the mirror surface. While the coating layer 3a need only be thick enough to prevent transmission of light therethrough and may therefore be as thin as a few μm, the actually practicle thickness thereof is within the range of 200 to 500 μm in view of the mechanical strength it requires and the fact that it may later become necessary to refinish it for the removal of stains etc.

Since the coating layer is formed on the mirror formation surface to which some of fibers of the composite material extend in the perpendicular direction, even if the thickness of the coating layer is slightly excessive, the c/c composite is not substantially elongated in the perpendicular direction. Thus, deformation is prevented when a deforming force acts on the coating layer.

When the mirror surface formation material 3 has not been densely coated, it can be increased in density or converted to an amorphous state by plasma or laser glazing or by a mechanical treatment such as shot peening or rolling, if necessary.

The Table below shows the physical characteristics of the c/c composite mentioned above in comparison with the physical characters of metals heretofore used as the substrate.

|  | c/c composite | Al alloy | Cu | Fe |
|---|---|---|---|---|
| Elastic modulus × 10⁴ (kg/mm²) | 3.5 | 0.75 | 0.95 | 2.1 |
| Specific gravity (g/cm³) | 1.8 | 2.6 | 8.9 | 7.9 |
| Coefficient of thermal expansion (× 10/°C.) | 0.5 | 21 | 17 | 12 |
| Heat transfer efficiency (cal/cm · sec. °C.) | 1.2 | 0.57 | 0.94 | 0.18 |

From the above Table, it is obvious that the c/c composite material has a high elastic modulus and heat transfer efficiency and low specific gravity and coefficient of thermal expansion compared with the metals heretofore used for the substrate.

As has been described in the foregoing, since the optical mirror according to the invention uses the c/c composite material as its substrate, as compared with aluminum, it is possible to obtain a coefficient of thermal expansion, reduced to one-fourtieth, a specific weight reduced by about 50% and more than five times the modulus of elasticity. Thus, the thermal deformation of the product can be reduced to reduce deformation due to the gravity and centrifugal forces, thus permitting fabrication of superlarge mirrors and superhighspeed revolving polygonal mirrors. Further, since the c/c composite has excellent heat resistance and oxidization resistance, by using as the coating material a material having high heat resistance and high oxidization resistance it is possible to provide a mirror which can be used in high temperature environments or a high-output laser mirror that does not require cooling.

An example of the invention will now be given.

EXAMPLE

One surface of a c/c composite material of three-dimensional structure 70 mm in length, 17 mm in width and 14 mm in thickness (produced by Toray Industry Inc., Japan) was coated with Mo by plasma weld injection to form a layer of Mo having a thickness of about 50 μm and serving as an intermediate layer. The layer of Mo deposited on the composite material was coated with Al by low-pressure plasma weld injection to form a layer of Al having a thickness of about 700 μm and serving as a mirror surface forming material.

The formed Al layer was polished by super-presicion milling to remove part of the Al layer, thereby forming a plane mirror having a thickness of about 350 μm.

The plane mirror was scanned lengthwise with a CO laser beam having a spot diameter of 1 mm and an output of 2 kw at a scanning velocity of 0.5 m/min. As a resulnct no discernible deformation could be observed.

For comparison, a plane mirror was formed by following the same procedure as described above except for use of an Al material in place of the c/c composite material. The plane mirror thus formed was scanned laterally in the same manner as described above. In this case, there was observed deformation of about 15 μm when the output was 1 KW and of about 22 μm when the output was 2 KW.

What is claimed is:

1. An optical mirror, comprising:
   (i) a mirror substrate consisting of a c/c composite;
   (ii) an intermediate layer of molybdenum, tungsten or niobium formed on said mirror substrate in a thickness ranging from 40 to 100 μm; and
   (iii) a mirror surface forming material formed on said intermediate layer having a thickness of 500 to 1000 μm, said mirror surface forming material being cut and polished so that the resultant layer, having a mirror surface, has a thickness enabling said mirror substrate to suppress deformation of said resultant layer.

2. The mirror of claim 1, wherein said c/c composite has fibers extending in the perpendicular direction of said mirror surface.

3. The mirror of claim 1, wherein said resultant layer has a thickness of 200 to 500 μm.

4. The mirror of claim 1, wherein the material of said mirror layer is an aluminum alloy, a copper alloy, tungsten, molybdenum, iridium, rhodium, gold or platinum.

5. An optical mirror, consisting essentially of:
   (i) a mirror substrate consisting of a c/c composite;
   (ii) an intermediate layer of molybdenum, tungsten or niobium formed on said mirror substrate to a thickness ranging from 40 to 100 μm; and
   (iii) a mirror surface formed on said intermediate layer having been cut and polished to a thickness such that the mirror layer has a thickness which enables the mirror substrate to suppress any deformation of the mirror layer resulting from the application of heat to said mirror layer.

6. The optical mirror of claim 5, wherein said mirror surface layer has a thickness ranging from 200 to 500 μm.

7. The optical mirror of claim 5, wherein said mirror surface layer, prior to being cut and polished, has a thickness ranging from 500 to 1000 μm.

8. A laminated structure capable of being cut and polished to an optical mirror product, consisting essentially of:
   (i) a mirror substrate consisting of a c/c composite;
   (ii) an intermediate layer of molybdenum, tungsten or niobium formed on said mirror substrate to a thickness ranging from 40 to 100 μm; and (iii) a mirror surface forming material formed on said intermediate layer having a thickness of 500 to 1000 μm, said mirror surface forming material capable of being cut and polished so that the resultant layer having a mirror surface has a thickness which enables said mirror substrate to suppress any deformation of the mirror layer resulting from the application of heat to said mirror layer.

* * * * *

UNITED STATES PATENT AND TRADEMARK OFFICE
CERTIFICATE OF CORRECTION

PATENT NO. : 4,772,111

DATED : Sep. 20, 1988

INVENTOR(S) : Hirofumi SHIMURA et al.

It is certified that error appears in the above-identified patent and that said Letters Patent is hereby corrected as shown below:

On the Title Page, Item [54]:

A word in the Title is misspelled; please change "molydenum" to read:

-- molybdenum --

Signed and Sealed this

Seventh Day of February, 1989

Attest:

DONALD J. QUIGG

*Attesting Officer*     *Commissioner of Patents and Trademarks*